United States Patent [19]
Holloway

[11] Patent Number: 6,131,852
[45] Date of Patent: Oct. 17, 2000

[54] AIRCRAFT UNDERCARRIAGE LOCKING SYSTEM

[75] Inventor: Gary L Holloway, Filton, United Kingdom

[73] Assignee: British Aerospace Public Limited Company, Farnborough, United Kingdom

[21] Appl. No.: 09/397,146

[22] Filed: Sep. 16, 1999

Related U.S. Application Data

[63] Continuation of application No. PCT/GB99/00498, Feb. 18, 1999.

[30] Foreign Application Priority Data

Feb. 18, 1998 [GB] United Kingdom .................. 9803315

[51] Int. Cl.$^7$ .................................................. B64C 25/10
[52] U.S. Cl. ..................................................... 244/102 R
[58] Field of Search ........................... 244/100 R, 102 R, 244/102 SS, 102 SL, 104 FP

[56] References Cited

U.S. PATENT DOCUMENTS

| 3,086,733 | 4/1963 | Hartel . |
|---|---|---|
| 4,328,939 | 5/1982 | Davies et al. . |
| 4,345,727 | 8/1982 | Brown et al. . |
| 4,392,622 | 7/1983 | McClaflin . |

FOREIGN PATENT DOCUMENTS

| 0 031 602 | 7/1981 | European Pat. Off. . |
|---|---|---|
| 1 452 154 | 9/1966 | France . |
| 519 681 | 4/1940 | United Kingdom . |
| 747 334 | 4/1956 | United Kingdom . |
| 1 128 829 | 10/1968 | United Kingdom . |

Primary Examiner—Galen L. Barefoot
Attorney, Agent, or Firm—Nixon & Vanderhye P.C.

[57] ABSTRACT

An aircraft undercarriage having a drag stay mechanism 22 extending upwardly and rearwardly from a main leg portion of the gear to a part of the aircraft structure. The undercarriage also includes a locking linkage extending between the main leg 10 and the drag stay means 22, being arranged releasably to lock the drag stay members 24, 26 in a substantially in-line position.

8 Claims, 4 Drawing Sheets

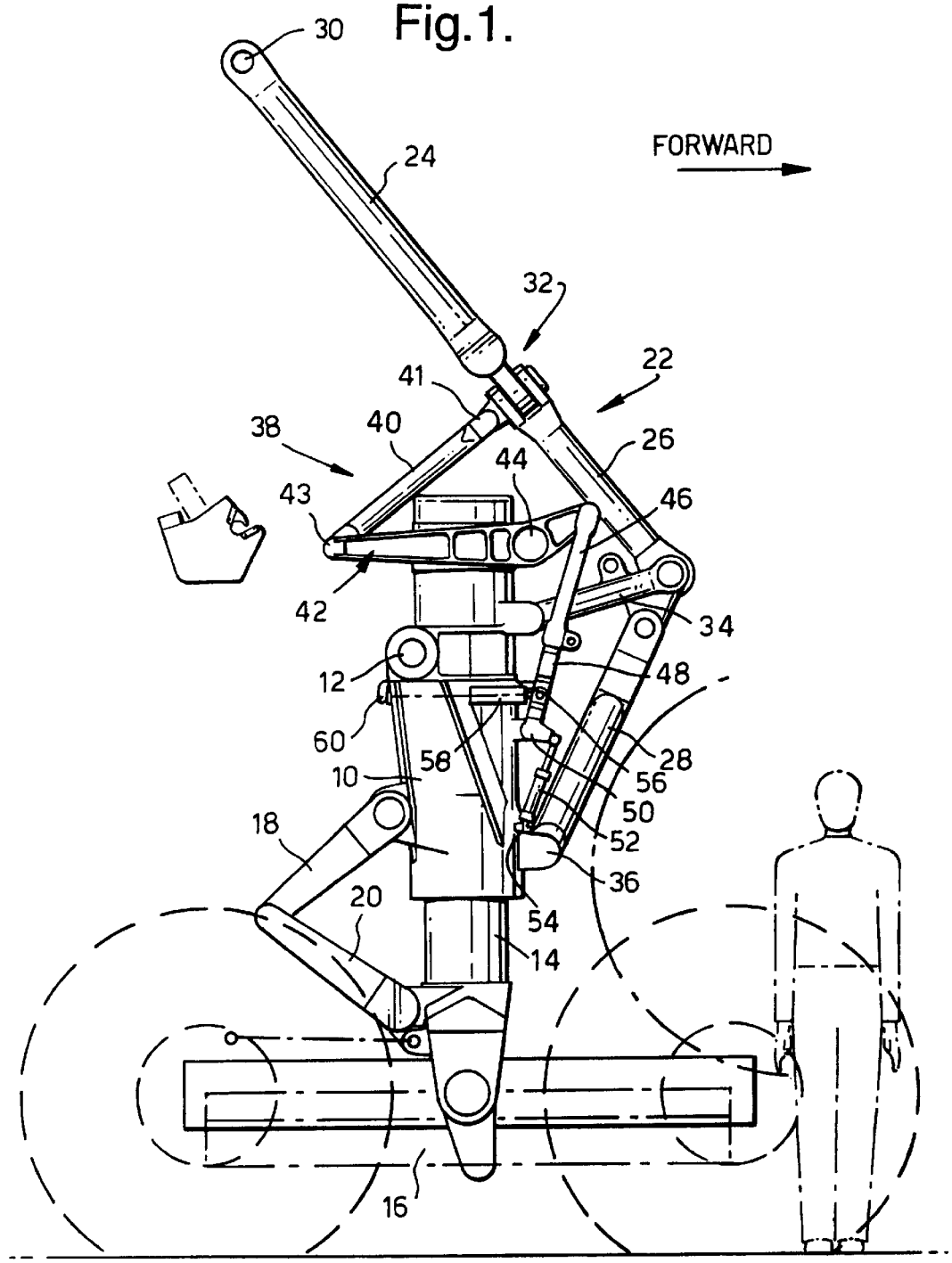

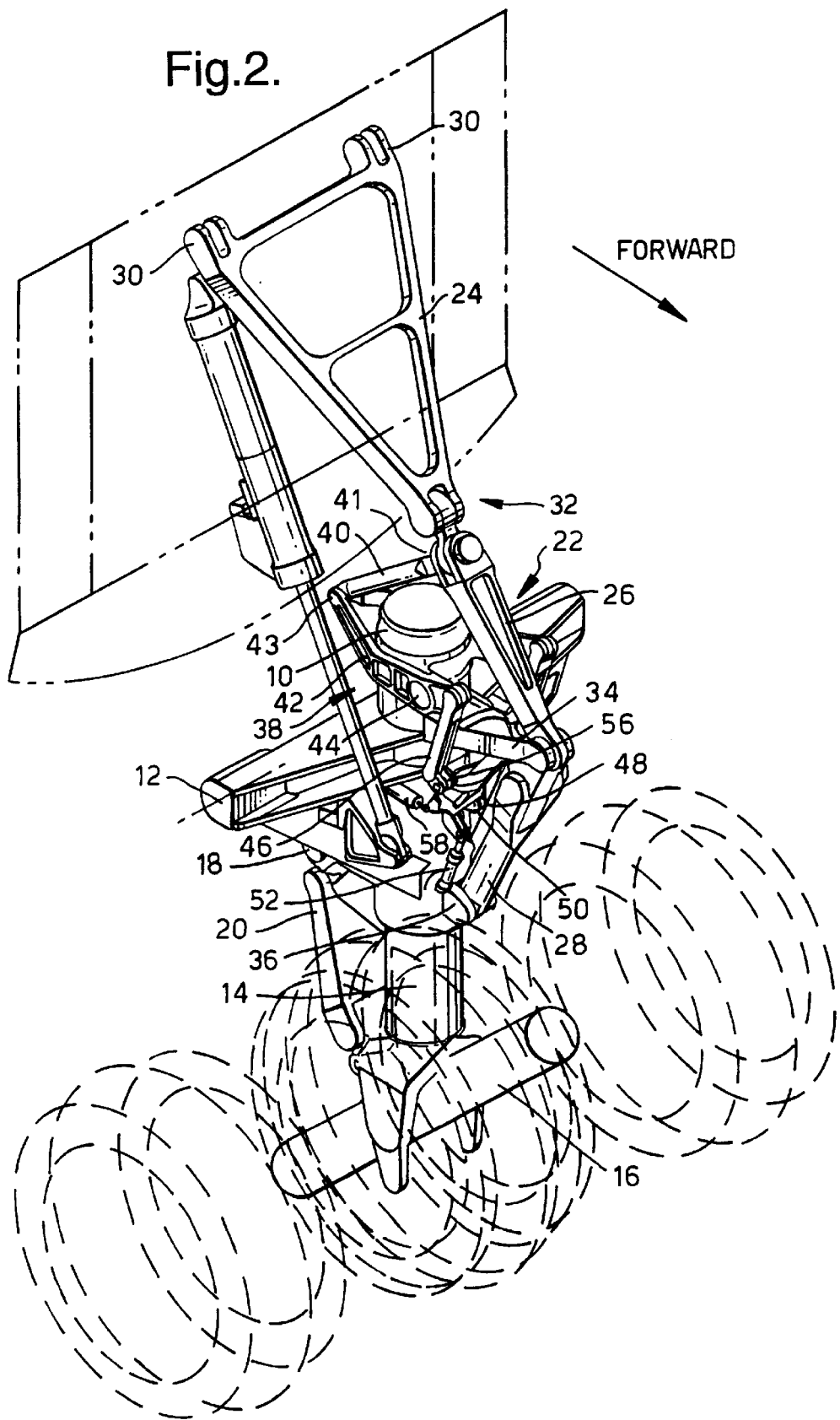

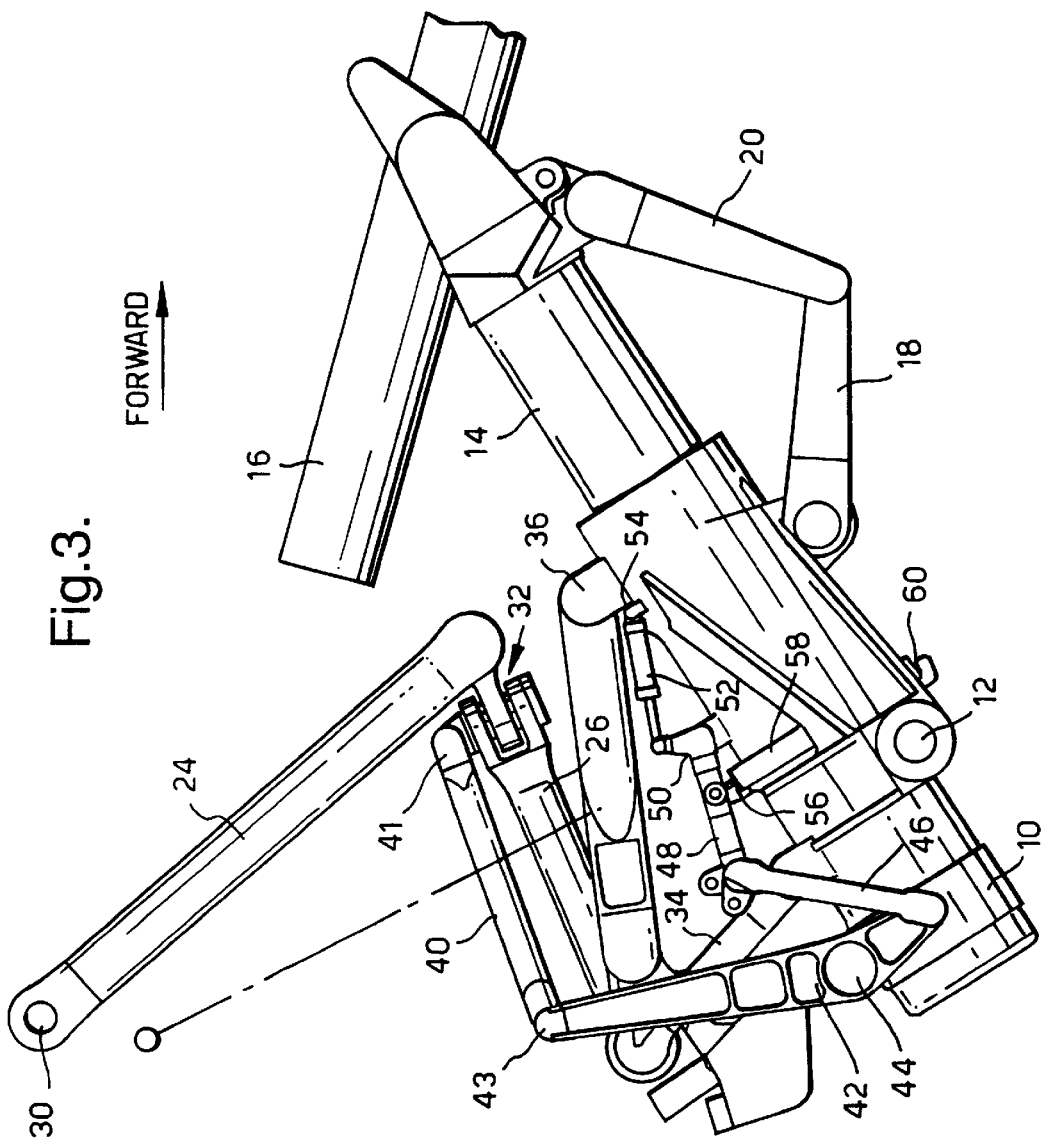

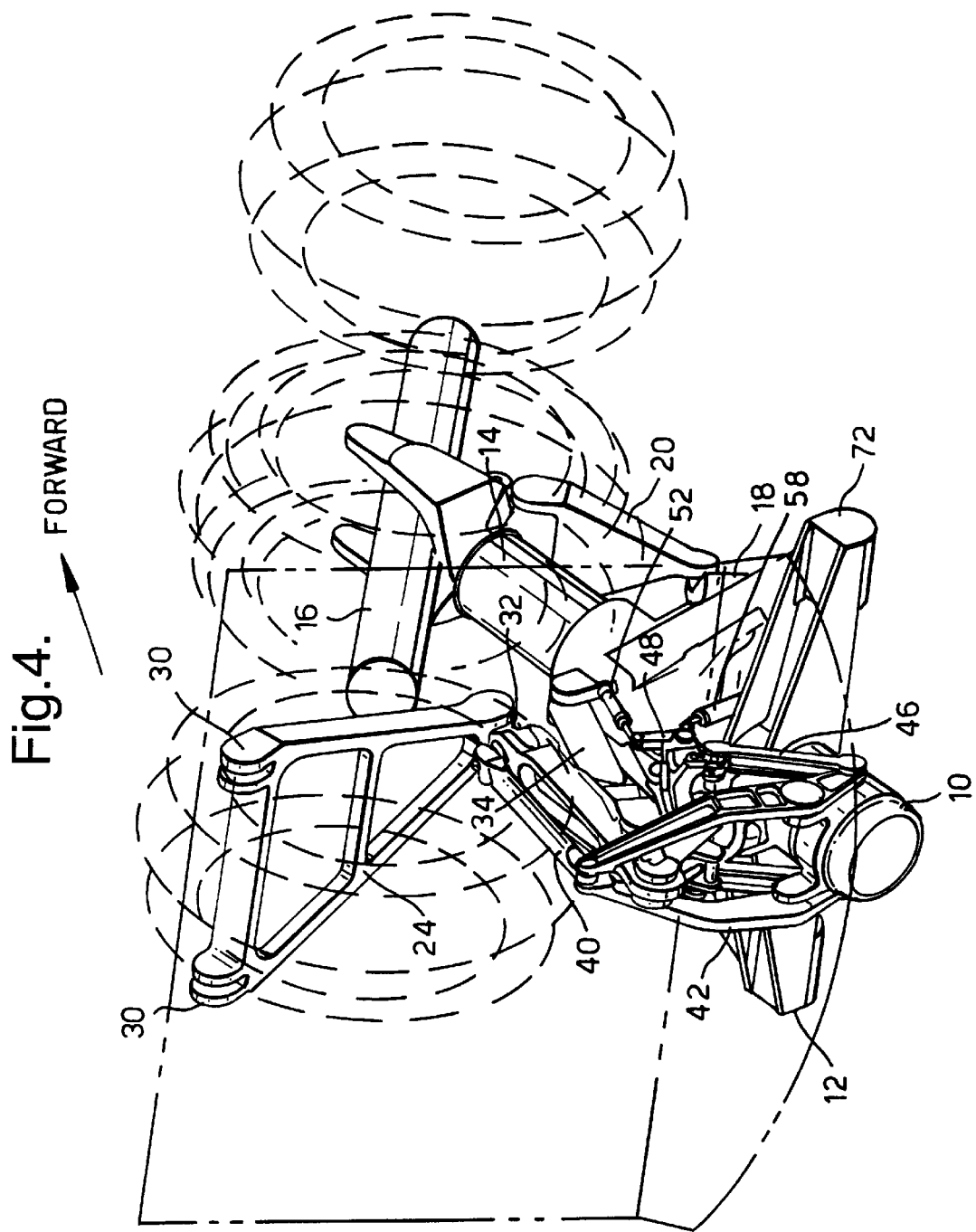

AIRCRAFT UNDERCARRIAGE LOCKING SYSTEM

This application is a continuation of PCT/GB99/00498 filed Feb. 18, 1999.

BACKGROUND OF THE INVENTION

1. Field of the Invention

This invention relates to an aircraft undercarriage including a downlock mechanism.

2. Discussion of Prior Art

An aircraft undercarriage normally includes a downlock mechanism which ensures that the deployed undercarriage forms a stable structure, which does not collapse under normal operational ground loading. This is normally done by providing a drag stay extending in a straight line such that loads are transferred efficiently into the aircraft structure. Particularly where the landing gear is a main body landing gear with braked wheels, the stay and support structure need to be capable of withstanding considerable loads. In addition the aircraft undercarriage is required to retract into a compact space within the undercarriage bay, which is usually determined by factors such as the spacing between adjacent structural bulkheads and so stringent demands are placed on the designer to provide an undercarriage capable of being stowed within the allocated space whilst being capable of reliably reacting the usual loads when deployed.

Further complications are introduced when the undercarriage has a four or more wheeled bogey because the bogey itself occupies a large amount of space and also the landing gear and downlock mechanism must be capable of moving between the retracted and deployed positions without the bogey or wheels colliding with the undercarriage mechanism. A yet further problem in designing such arrangements is the need to ensure that potentially secure locking arrangements are not prejudiced by relative movement or flexing of the undercarriage relative to the aircraft structure.

SUMMARY OF THE INVENTION

Accordingly, in one aspect of this invention there is provided an aircraft undercarriage, including:

- a main leg portion pivotally connected to the aircraft structure for movement between a retracted and a deployed position,
- a drag stay means which, when the main leg portion is in a deployed position, extends from a connection at one end disposed to the front of the leg portion and extends upwardly and backwardly relative to the leg portion to a connection at its other end to a part of the aircraft structure, the drag stay means including two pivotally coupled drag stay members which pivot during deployment from a stored folded configuration to a substantially in-line deployed condition, and
- locking linkage means extending between the main leg portion and said drag stay means and arranged releasably to lock said drag stay members in said substantially in-line position.

In this arrangement, the drag stay means may follow an "up and over" configuration which allows the drag stay members a generous moment arm with respect to the pivot of the main leg portion without encroaching excessively in the space allocated for the undercarriage in the undercarriage bay. Furthermore, the locking means may comprise a linkage disposed between the drag stay members and the main leg portion in which case the locking means will not be significantly influenced by flexing or movement of the aircraft structure.

Preferably, the connections at opposite ends of said drag stay means are spherical connections allowing spherical movement at at least one end, thereby preventing side-loading of the locking means and the drag stay joints during relative twisting or sideways deflections of the leg portion relative to the connection of the drag stay means to the aircraft structure.

Preferably, the pivotal coupling between the drag stay members comprises a cardan joint.

The drag stay means preferably comprises said two drag stay members and a further, lower, drag stay member pivoted at its lower end to the leg portion and pivotally coupled at its other end both to the lower end of the lower of the two drag stay members and to a strut pivotally connected to the main leg portion.

Preferably, the locking linkage means comprises a lock stay pivotally coupled at one end to one of said drag stay members in the region of said pivotal coupling and coupled at its other end to the remainder of a locking linkage assembly.

When the undercarriage is in the deployed and locked position, said lock stay preferably extends generally perpendicular to the longitudinal axis of the in-line drag stay members. The locking linkage means preferably includes a biassed over-centre toggle arrangement realisably to lock the linkage in the locking position. The locking linkage means preferably includes a release actuator for releasing said over-centre arrangement.

Whilst the invention has been described above, it extends to any inventive combination of features set out above or in the following description.

BRIEF DESCRIPTION OF THE DRAWINGS

The invention may be performed in various ways and, by way of example only, an embodiment thereof will now be described in detail, reference being made to the accompanying drawings, in which:

FIG. 1 is a side view of an aircraft undercarriage with a downlock mechanism in accordance with this invention, with the landing gear deployed and locked;

FIG. 2 is a perspective view from the front on the undercarriage of FIG. 1 deployed and locked;

FIG. 3 is a side view of the undercarriage of FIGS. 1 and 2 in the retracted position, and FIG. 4 is a perspective view from the rear on the undercarriage of FIGS. 1 to 3 in the retracted position.

DETAILED DISCUSSION OF PREFERRED EMBODIMENTS

Referring to the Figures, the undercarriage comprises a main leg portion 10 pivoted at 12 to a part of the main aircraft structure (not shown). The main leg portion receives in its lower end the telescopic sliding tube 14 of a shock absorber assembly. The sliding tube is pivoted to the bogey 16 of a four wheel bogey. In this particular embodiment, the bogey is non-steerable, and the orientation of the bogey 16 is maintained by means of an upper torque link 18 and a lower torque link 20. In other embodiments the bogey may be steerable.

The main leg portion 10 and the lower portion of the undercarriage is stabilised by means of an up-and-over forward drag stay indicated generally at 22, and comprising upper, intermediate, and lower drag stays, 24, 26 and 28 respectively. The upper end of the upper drag stay 24 is connected by a pin joint 30 to a structural part of the aircraft (not shown). The lower end of the upper stay is connected by a cardan joint 32 to the upper end of the intermediate drag stay 26. The cardan joint allows relative pivoting movement of the upper and intermediate drag stays about two mutually perpendicular axes. The lower end of the intermediate stay is pivotally coupled to both the upper end of the lower drag stay 28 and a spacer strut 34 pivotally connected at its other end to an upper part of the main leg portion. The lower end of the lower drag stay is connected by a spherical joint 36 to the main leg portion 10. It will be noted from FIG. 2 that the upper drag stay 24 is triangular in plan.

Referring now to the locking linkage indicated generally at 38 this comprises a lock stay 40 which is coupled by a spherical joint 41 to the lower pin of the cardan joint 32 and coupled at the other end by a spherical joint 43 to the apex of a wishbone-shaped articulation arm 42. The articulation arm 42 is pivoted to a lug 44 on the upper part of the main leg portion 10, with extension arms pivoted to respective upper lock links 46 which pass to either side of the strut 34 to be coupled to respective ends of a V-shaped lower lock link 48. The apex of the lower lock link 48 is pivoted to a lug 50 on the main leg portion 10. The lower end of the lower lock link 48 is cranked and connected to the shaft of an unlock actuator 52 whose lower end is pivoted to a lug 54 on the main leg portion 10. The main leg portion 10 also includes link over-centre stops 56 against which the spaced limbs of the lower lock link 48 are urged by respective lock springs 58 connected one to either side of the lower lock link 48 at one end and connected to lugs 60 on the other side of the main leg portion at their other. The springs 58 act in tension thus pulling the lower lock link 48 into engagement with the stops 56 with the upper lock link 46 and the lower lock link 48 in a slightly over-centre position when the undercarriage is locked. Thus in this arrangement compression forces tending to buckle the combination of the upper and lower lock links 46, 48 will be resisted by the stops 56.

It will be noted that the lock stay 40 extends perpendicularly to the upper and intermediate drag stays 24 26 when the landing gear is locked in the deployed condition. Forces tending to pivot the drag stays 24, 26 in the direction away from the lock stay will pass through the downlock linkage and tend to urge the lower lock link 42 against the stops 48. Forces tending to pivot the drag stays 24, 26 in the direction toward the lock stay will tend to align links 46, 48 but will be resisted by springs 58. This therefore provides an extremely resilient locking mechanism to keep the upper and intermediate drag stays 24, 26 in line.

During retraction, the unlock actuator 52 is retracted to rotate the lower lock link 48 clockwise as viewed in FIG. 1, away from the stops 56 into an unstable over-centre position. This in turn causes a clockwise rotation of the articulation arm 42 (as seen in FIG. 1) which forces the drag stay joint to fold upwards during initial retraction movement.

It will be seen particularly from FIGS. 3 and 4 that the landing gear when stowed occupies a very compact volume in the undercarriage bay with the lock and stay structure folded closely with respect to the leg portion.

It should be noted that the illustrated arrangement may be adapted as necessary to suit a particular application. In particular, whilst as shown the undercarriage retracts rearwardly, the arrangement could be modified to a mirror image version to allow retraction forwardly.

The mechanism described above fulfils the following basic constraints. It achieves a stable structure for the landing gear in its locked-down condition. It avoids situating the lock links between the landing gear and the aircraft structure where relative deflections could cause inadvertent unlocking of the mechanism under ground loading. Furthermore, the lock links are located at a level where they are accessible from the ground to enable installation of a ground lock device during normal maintenance activities. In addition, the spherical bearings used in the linkages prevent the lock links from being loaded by twisting or sideways deflections of the leg relative to the drag stay aircraft attachment.

What is claimed is:

1. An aircraft undercarriage, including:
   a main leg portion pivotally connected to the aircraft structure for movement between a retracted and a deployed position, said aircraft structure having a forward and rearward direction,
   a drag stay which, when the main leg portion is in a deployed position, extends from a connection at one end disposed on a forward portion of the leg portion and extends upwardly and rearwardly relative to the leg portion to a connection at its other end to a part of the aircraft structure, the drag stay including two pivotally coupled drag stay members which pivot during deployment from a stored folded configuration to a substantially in-line deployed condition, and
   locking linkage extending between the main leg portion and said drag stay arranged releasably to lock said drag stay members in said substantially in-line position.

2. An aircraft undercarriage according to claim 1, wherein the connections at opposite ends of said drag stay allow spherical movement at at least one end.

3. An aircraft undercarriage according to claim 1, wherein the pivotable coupling between said drag stay members comprises a cardan joint.

4. An aircraft undercarriage according to claim 1, wherein said drag stay comprises said two drag stay members and a further, lower, drag stay member pivoted at its lower end to the leg portion and pivotally coupled at its other end both to the lower end of the lower of the two drag stay members and to a strut connected to the main leg portion.

5. An aircraft undercarriage according to claim 1, wherein said locking linkage comprises a lock stay pivotally coupled at one end to one of said drag stay members in the region of said pivotal coupling, and coupled at its other end to the remainder of a locking linkage assembly.

6. An aircraft undercarriage according to claim 5, wherein in said deployed and locked position, said lock stay extends generally perpendicular to the longitudinal axis of said in-line drag stay members.

7. An aircraft undercarriage according to claim 1, wherein locking linkage includes a biassed over-centre toggle arrangement realisably to lock said linkage in said locked position.

8. An aircraft undercarriage according to claim 7, wherein said linkage includes a release actuator for releasing said over-centre arrangement.

* * * * *